United States Patent [19]

Minnema et al.

[11] 4,347,288

[45] Aug. 31, 1982

[54] HIGH-VOLTAGE CABLE HAVING A POLYTHENE CONTAINING INSULATION SHEATH WHICH IS PROVIDED WITH MEANS TO AVOID OR IMPEDE THE FORMATION OR THE GROWTH OF WATERTREES, THE MEANS COMPRISING A METAL COMPLEX

[75] Inventors: Lourens Minnema; Grietje N. Van Boekel-Mol, both of Eindhoven, Netherlands

[73] Assignee: U.S. Philips Corporation, New York, N.Y.

[21] Appl. No.: 194,156

[22] Filed: Oct. 2, 1980

[30] Foreign Application Priority Data

Oct. 16, 1979 [NL] Netherlands .......................... 7907626

[51] Int. Cl.³ ...................... B32B 15/02; B32B 15/08; H01B 3/30

[52] U.S. Cl. .............................. 428/389; 174/110 SR; 174/110 PM

[58] Field of Search ................. 428/389; 174/110 SR, 174/110 PM

[56] References Cited

U.S. PATENT DOCUMENTS 3,110,623 11/1963 Feild ................................... 428/389

*Primary Examiner*—James C. Cannon
*Attorney, Agent, or Firm*—Norman N. Spain

[57] ABSTRACT

A high voltage cable comprising a conductor and a polythene containing insulation sheath is provided with a metal complex of a diketone, salicylic acid optionally substituted with 1 to 2 lower alkyl groups, or a Schiff's base formed from an amine and salicylaldehyde optionally substituted with 1 to 2 lower alkyl groups, in order to prevent or impede the growth of watertrees during use.

5 Claims, 1 Drawing Figure

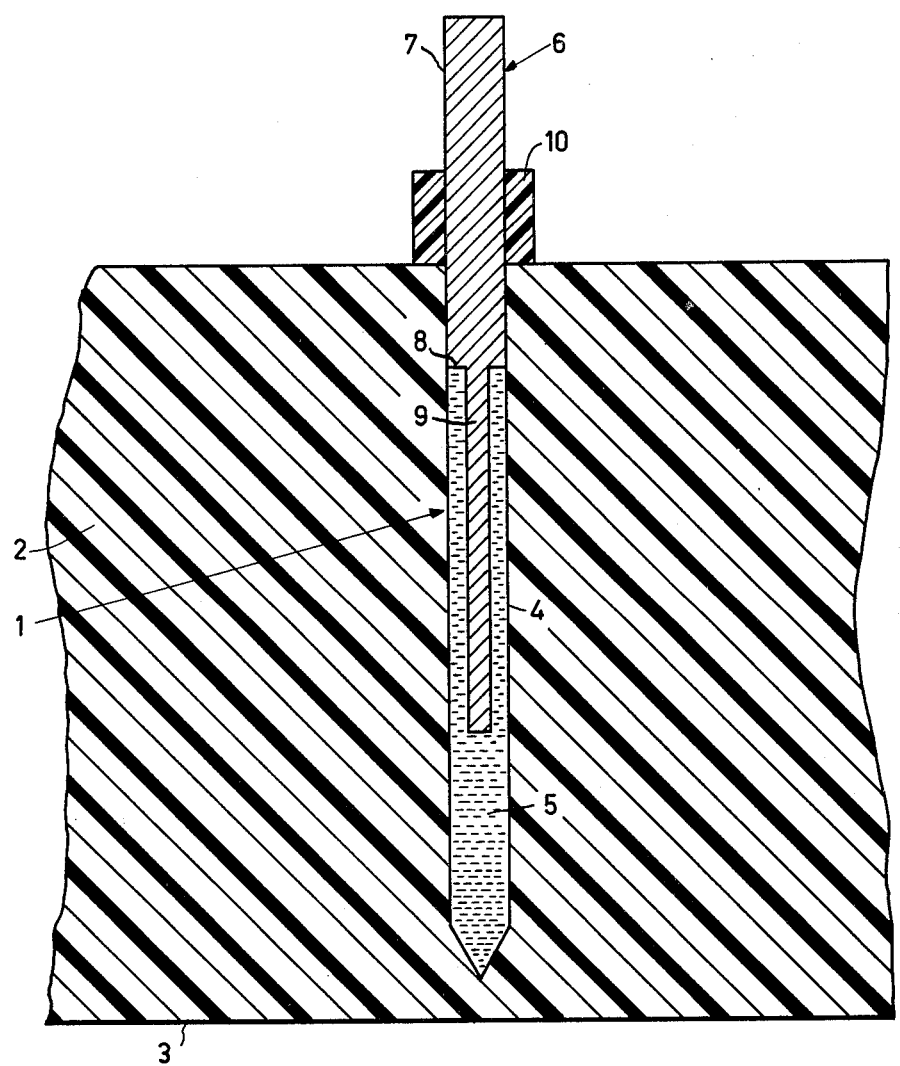

HIGH-VOLTAGE CABLE HAVING A POLYTHENE CONTAINING INSULATION SHEATH WHICH IS PROVIDED WITH MEANS TO AVOID OR IMPEDE THE FORMATION OR THE GROWTH OF WATERTREES, THE MEANS COMPRISING A METAL COMPLEX

BACKGROUND OF THE INVENTION

The invention relates to a high-voltage cable which comprises a conductor and a polythene containing insulation sheath provided around the conductor and comprising an agent to prevent or impede the formation or the growth of watertrees.

A high-voltage cable generally comprises a central copper conductor having a diameter which may vary from a few millimeters to a few centimeters. Around the conductor an internal semiconductor screen is present which, for example, consists of polythene (polyethylene) or a copolymer of polythene, for example, the copolymer of ethylene and vinyl acetate in which soot has been dispersed. The internal semiconductor screen is covered and surrounded by a polythene containing insulation sheath. The insulation sheath may consist entirely of polythene (PE), of crosslinked polythene (XLPE) or of a copolymer of ethene and, for example, another alkene or a diene, such as the copolymer of ethene and propene (EPM) or the terpolymer of ethene, propene and a diene (EPDM). The abbreviations in brackets are internationally used indications of the type of the relevant insulation material. Around the insulation sheath there is provided an external semiconductor screen of usually the same composition as the first semiconductor screen. Around the external semiconductor screen there is present a conductive layer of, for example, a metal foil, such as a copper foil, which in turn is covered with a layer of a synthetic resin, over which the usual reinforcement and finally an outer cover of a synthetic resin of for example PVC, is provided.

In particular the high-voltage cables insulated with polythene (PE) or cross-linked polythene (XLPE) are widely used nowadays.

When the high-voltage cable is used, small hair line cracks occur with time under the influence of moisture in the polythene containing insulation sheath which enlarge in the form of a tree with numerous branches. Such branched breakage forms are termed watertrees. The phenomenon is internationally known as "watertreeing" or "electrochemical treeing". It will be obvious that the watertrees have a detrimental influence on the insulation qualities of the polythene containing sheath and may give rise to breakdown.

The formation and the growth of watertrees may be inhibited by ensuring that no moisture is incorporated in the polythene containing insulation material during the manufacture of the cable and then furthermore sealing the cable in a moisture-tight manner from the atmosphere, for example, by providing the finished cable with a metal cover such as a lead or aluminum sheath. It will be obvious that such a cable is very expensive and in addition becomes less loadable thermally.

It is known that the growth of watertrees in polythene containing insulation materials is retarded when the insulation material contains acetophenone. This is the decomposition product of dicumylperoxide which usually is used as an auxiliary substance in cross-linking polythene. The acetophenone is rather volatile and in the long run disappears from the insulation material so that the delay of the growth of watertrees only has a temporary character.

It is furthermore known from German Offenlegungsschrift 2,537,285 that the growth of watertrees is suppressed when an electrolyte is added to the polythene containing insulation sheath. Here, however, the possibility of breakdown of the insulation is increased, a result which is rather to be avoided.

SUMMARY OF THE INVENTION

The invention provides a high-voltage cable in which the formation and the growth of watertrees is permanently prevented or is very strongly suppressed without the above-mentioned disadvantages occurring.

The invention relates to a high-voltage cable of the kind mentioned in the opening paragraph and which is characterized in that the agent is a metal complex of a diketone, salicylic acid which may be substituted with 1-2 lower alkyl groups or of a Schiff's base formed from an amine and salicylaldehyde which may be substituted with 1-2 lower alkyl groups.

The term, "lower alkyl group" is understood to mean an alkyl group having from 1 to 4 carbon atoms.

The precise action of the agent used in the cable according to the invention is not yet understood. It is presumed that the agent causes a strong reduction of the electrostriction which occurs in the very high field strengths, in the order of magnitude of 250 kV/mm at which watertrees are formed.

Good results are reached when complexes of metals of the series of the transition elements are used. This applies in particular to a complex of a metal which is selected from the group formed by copper, iron, cobalt, chromium, manganese and cerium.

When a metal complex of a diketone is used, the diketone preferably is an acyl alkanone, in which both the acyl group and the alkanone group comprise maximally 12 carbon atoms and in which furthermore the acyl group may be substituted with one or several halogen atoms.

Favourable results are obtained when a metal complex of acyl acetone is used in which the acyl group also comprises at most 12 carbon atoms and is substituted with one or several halogen atoms. Suitable halogen atoms are in particular fluorine and chlorine.

Very active agents used in the high-voltage cable according to the invention are copper acetyl acetonate, iron acetyl acetonate or a mixture thereof.

Other active agents are the cobalt complex, chromium complex, manganese complex or cerium complex of acetylacetonate, the copper complex, iron complex, chromium complex, cobalt complex, manganese complex, cerium complex of 2,2,6,6-tetramethyl-3,5-heptadione; of hexafluoroacetylacetone; of trifluoroacetylacetone; of benzoylacetone; of trichloroacetylacetone; of acetonylacetone; of 3,5 diisopropyl salicylic acid; of bis(salicylidene)-ethylenediamine; of bis(3,5-diisopropylsalicylidene)-ethylenediamine or of 3,5-diisopropylsalicylic acid.

The quantity of the metal complex used in the insulation sheath may vary within wide limits and generally is from 0.05 to 1% by weight. 0.05 to 0.5% by weight of the metal complex is preferably used.

The high-voltage cable can be manufactured according to the conventional methods in which the metal complex described above is added in a finely divided form to the polythene containing insulation material from which the insulation sheath is usually manufactured by means of an extrusion process.

It is recommended that the metal complex also be used in the semiconductor screens of the high-voltage cable.

BRIEF DESCRIPTION OF THE FIGURE

The sole FIGURE in the drawing is a cross-sectional view of the device used in the waterneedle test.

DETAILED DESCRIPTION OF THE INVENTION

The invention will now be described in more detail by way of example in the following test and example with reference to the FIGURE of the accompanying drawing. The test used is a standard test for studying the formation and the growth of watertrees in cable insulation material and is generally referred to as the waterneedle test.

WATERNEEDLE TEST

In order to obtain reproducible data it is necessary to carry out the test below with great accuracy.

The waterneedle test will now be described in greater detail with reference to the FIGURE in the drawing.

The test is carried out with four parallel arranged waterneedles at a mutual distance of 30 mm. One of the waterneedles is referenced 1 in the FIGURE. Waterneedle 1 is provided in polythene strip 2 obtained by rolling polythene granulates and compressing it to form a strip strip 2. Strip 2 has a longitudinal dimension of 280 mm, a width of 6 mm and a height (thickness) of 25 mm. The lower side of strip 2, as well as the ends thereof (not shown), are provided with a grounded metal layer 3. Waterneedle 1 is provided in strip 2 as follows. By means of a drill having a diameter of 1.9 mm a hole 4 is drilled in strip 2 extending to a distance of 2.5 mm from the metallized lower side of strip 2.

Strip 2 is placed in a holder and then heated in a furnace at 100° C. for one hour. A metal needle having a diameter of 2.0 mm, an apex of 60° and a radius of curvature at the tip of 5 μm is heated at 120° C. for 30 minutes. The warm metal needle is pressed in hole 4 of the warm polythene strip 2 until the tip of the needle is at a distance of 1.3 mm from the lower side of strip 2. In order to neutralize internal stresses the strip 2 with clamped needle is heated at 105° C. for one hour and the hole is then cooled gradually by successively dipping the strip with the needle in place in water of 90° C., 75° C., 50° C. and room temperature each time for three minutes. The needle is carefully removed while rotating from the strip, after which the strip is heated for one hour at 105° C. and then cooled in air.

As a result hole 4 is produced. Exactly the same procedure is followed for providing the three other holes, not shown, which are at a mutual distance of 30 mm.

The holes are filled with distilled water 5 for the greater part. A platinum electrode 6 which comprises a first cylindrical portion 7, a shoulder 8 and a second cylindrical portion 9 is placed in the hole 4. The diameter of cylindrical portion 7 corresponds to the diameter of the bore of hole 4 so that cylindrical portion 7 fits exactly in hole 4. The cylindrical portion 7 extends within the hole 4 over a distance of 3 mm. The length of the second cylindrical portion 9 is 12 mm. The portion of the electrode 6 projecting from the hole 4 is provided with a polythene ring 10. The remaining space in the hole 4 is filled entirely with the distilled water 5.

To the platinum electrode (6) in all the 4 waterneedles (1) an applied alternating voltage of 8 kV, 1000 Hz is applied for 51.5 hours.

The resulting watertrees are made visible as follows. Around the four waterneedles 1 a block of polythene is cut from the strip 2. The blocks are heated in a boiling solution of 250 g of methylene blue in 120 ml of distilled water for 30 minutes. Microtome cuts are then made which are dipped in water at 90° C. for 12 hours. It was found that the easily visible watertrees had dimensions of approximately 50–100 μm.

Several waterneedle tests were carried out in an analogous manner to the above-described test, in which a polythene strip was used which contained 0.2% by weight of the agent described above, in particular of copper or iron acetylacetonate. It was found that either no watertrees were present or that they were only beginning to form therein.

EXAMPLE

Two 12/20 kV cable sections insulated with cross-linked polythene (XLPE), to one of which 0.2% by weight of copper acetylacetonate was added and none to the other, were provided with semiconductor screens of an ethene-vinylacetate copolymer and then laid in water of 25°–30° C. and subjected to an alternating voltage of 25 kV. The cable sections are not closed in a moisture-tight manner so that water can diffuse inwards. It was found that the cable insulation of the cable section which contained no copper acetylacetonate had clearly observable watertrees after 3 weeks. The cable section with the insulation comprising copper acetylacetonate showed no demonstrable watertrees after 6 weeks.

What is claimed is:

1. A high-voltage cable comprising a conductor and an ethylene polymer insulating sheath provided around said conductor and mixed in said insulating sheath a sufficient amount of a chemical means for preventing or impeding the formation of, or the growth of, watertrees, characterized in that said chemical means is a metal complex of a compound selected from the group consisting of diketones, salicylic acid which may be substituted with 1-2 lower alkyl groups and a Schiff's base formed from an amine and salicylaldehyde which may be substituted with 1-2 lower alkyl groups.

2. A high-voltage cable as claimed in claim 1, characterized in that the metal in the metal complex is a metal which is selected from the group formed by copper, iron, cobalt, chromium, manganese and cerium.

3. A high-voltage cable as claimed in claim 1 or 2, characterized in that the chemical means is a metal complex of an acylalkanone in which both the acyl group and the alkanone group comprises at most 12 carbon atoms and in which furthermore the acyl group may be substituted with one or several halogen atoms.

4. A high-voltage cable as claimed in claim 3, characterized in that the chemical means is a metal complex of acetylacetone.

5. A high-voltage cable as claimed in claim 4, characterized in that the chemical means is formed by copper acetylacetonate, iron acetylacetonate or a mixture thereof.

* * * * *